Dec. 24, 1968     H. F. CHAMBERLAIN     3,417,424
POULTRY PROCESSING APPARATUS

Filed Nov. 14, 1966     3 Sheets-Sheet 1

INVENTOR
Harold F. Chamberlain

BY
DeLio and Montgomery
ATTORNEYS

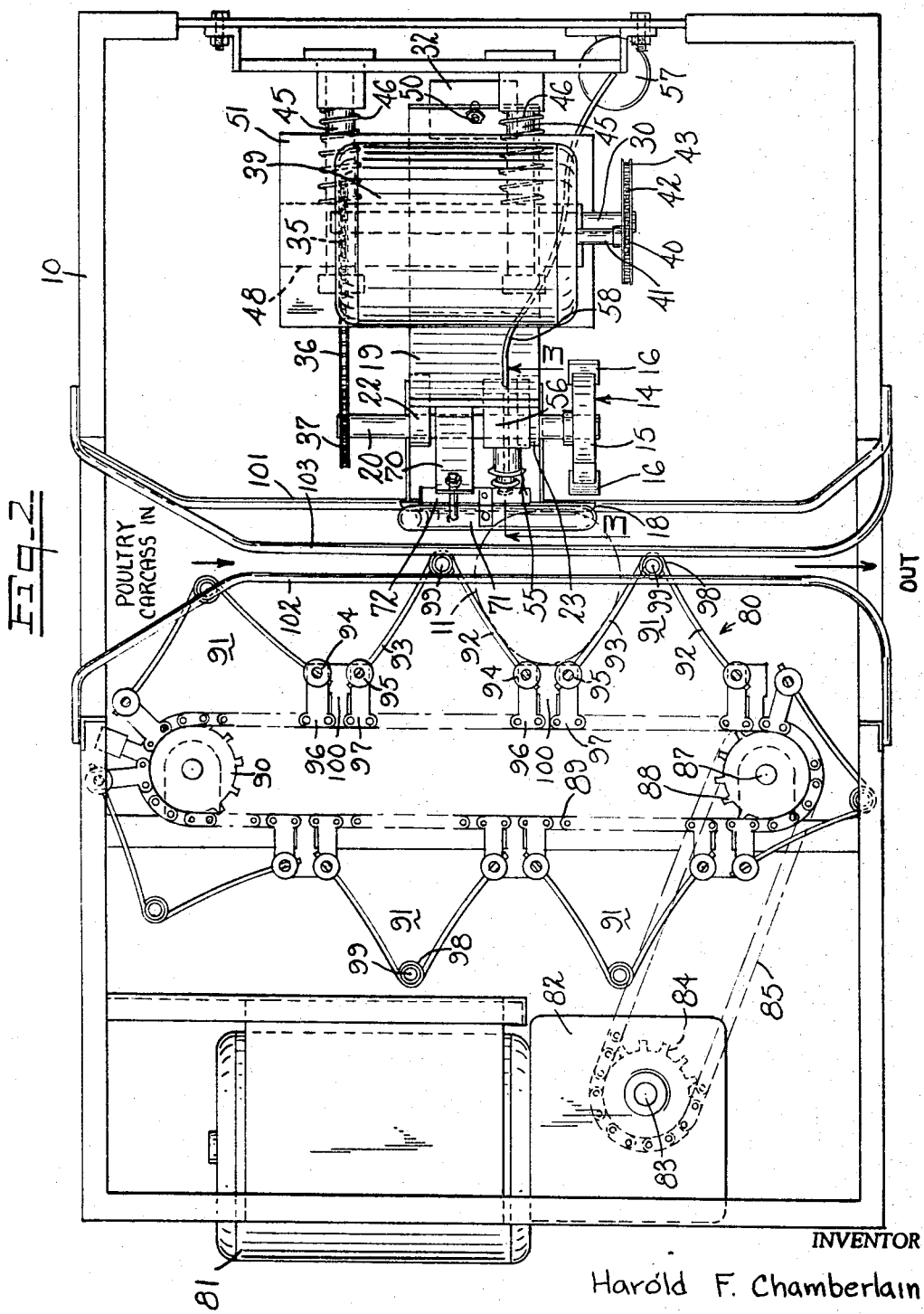

Dec. 24, 1968    H. F. CHAMBERLAIN    3,417,424
POULTRY PROCESSING APPARATUS
Filed Nov. 14, 1966    3 Sheets-Sheet 3
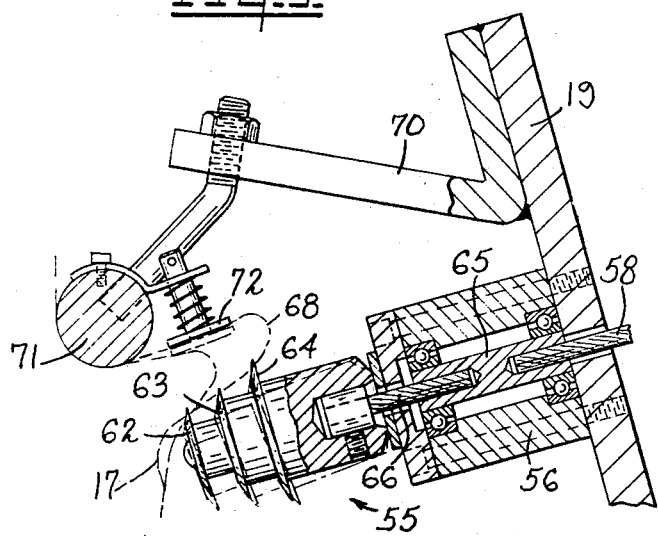
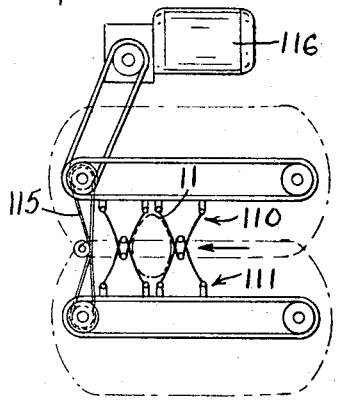
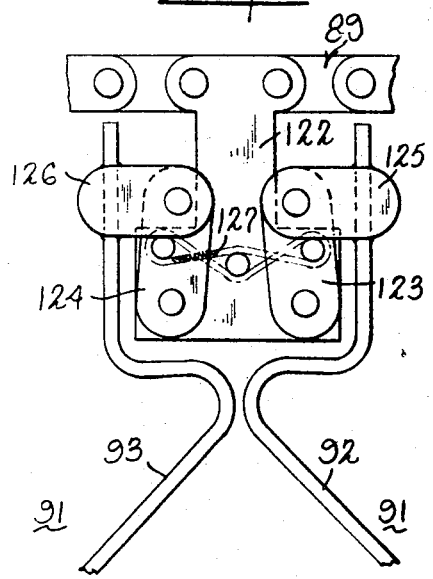
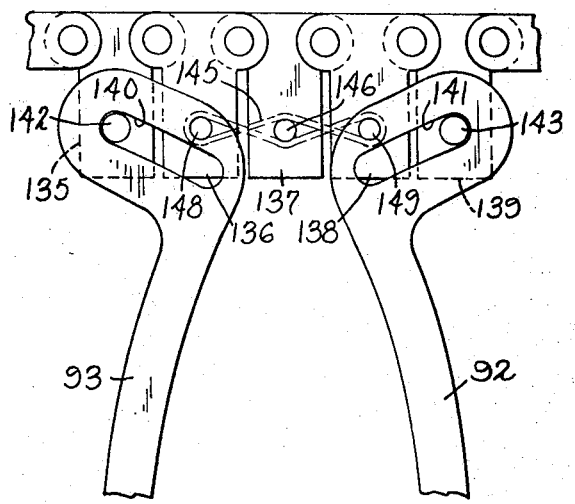
INVENTOR
Harold F. Chamberlain
BY Dedio and Montgomery
ATTORNEYS

United States Patent Office 3,417,424
Patented Dec. 24, 1968

3,417,424
POULTRY PROCESSING APPARATUS
Harold F. Chamberlain, New Haven, Conn., assignor to Jarvis Corporation, Hartford, Conn., a corporation of Conneticut
Filed Nov. 14, 1966, Ser. No. 593,773
11 Claims. (Cl. 17—11)

This invention relates to poultry processing and more particularly to mechanisms for holding and guiding poultry for processing and, further, to mechanisms for removing oil glands from poultry carcasses.

In the poultry industry it is of great importance that the inedible parts of a poultry carcass be properly removed without removing too much of the carcass itself. In the past, the inedible parts such as the oil glands, have been removed principally by hand. This has generally resulted in a few ounces or more of the edible portion of the carcass being removed with the inedible portion and, thus, resulted in substantial monetary loss.

Devices have been constructed for removing the oil glands from carcasses by machine. A machine of this type is disclosed in U.S. Patent No. 3,213,488 issued to the assignee of this invention. This patent discloses means for effectively slicing the oil gland from the poultry carcass. However, although this machine serves the purpose, it has been discovered that improvement thereto can further reduce waste in removing the oil gland.

It is also of great importance that adjustable mechanism be provided or positively guiding the poultry carcass during the processing steps, such as mentioned above. Unless the carcas is positively held, substantial waste will occur in an automated operation. Furthermore, means must be provided for adjusting to the different dimensions of a plurality of carcasses being processed rapidly through the processing machines.

In view of the foregoing, this invention provides such a holding mechanism for facilitating assembly line processing of poultry and the like.

Accordingly, it is an object of this invention to provide new and improved mechanisms for facilitating automated processing of poultry and the like.

Another object of this invention is to provide a new and improved mechanism for removing the oil gland from a poultry carcass without the necessity for further processing by hand.

A further object of this invention is to provide new and improved means for guiding a poultry carcass during the processing operation.

Still other objects and advantages of this invention will in part be obvious and will in part appear hereinafter.

The invention accordingly comprises an article of manufacture possessing the features, properties and relation of elements which will be exemplified in the article hereinafter described and the scope of the invention will be indicated in the claims.

For a fuller understanding of the nature and objects of the invention, reference is had to the following description, taken in connection with the accompanying drawings, in which:

FIG. 2 is a top plan view of the apparatus of FIG. 1;

FIG. 3 is a sectional view taken along line 3—3 of FIG. 2;

FIG. 4 is a diagrammatic view of an alternate mechanism for holding the poultry carcass according to this invention;

FIG. 5 is a top view of a portion of an improved mechanism for holding the carcass, including adjustment means; and FIG. 6 is a top view of a portion of another improved mechanism, including adjustment means, for holding the carcass during processing.

Figure 1:
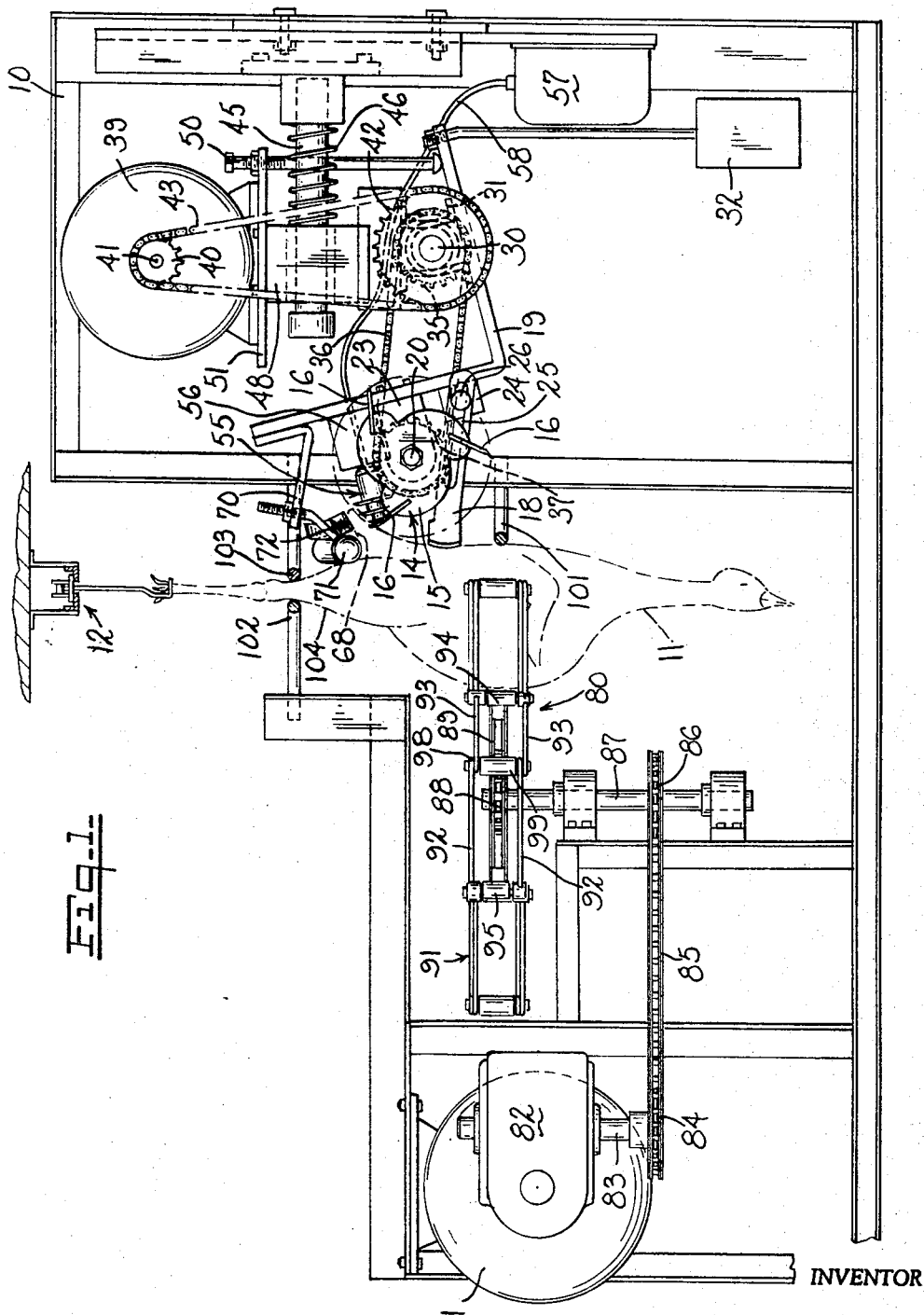
FIG. 1 is a front view of the apparatus embodying the invention.

Referring now to FIGS. 1–3, there is shown the preferred embodiment of this invention, which includes a housing 10 for the operating and processing parts of the machine. A poultry carcass 11 is fed to the machine by overhead conveyor 12. By the use of the conveyor 12, the poultry carcasses may be provided to the machine on a continuous production line basis. The apparatus of FIGS. 1–3 is of the type which performs the specific function of removing the oil gland from the poultry carcass. The apparatus includes the carcass conveyor mechanism which has utility not only in the instant invention, but also in the poultry processing field in general as well as other fields.

The oil gland removing portion of the invention includes a first cutter 14 having a central hub portion 15 and a plurality of blades 16. The cutter 14 acts to scrape and gouge out the oil gland 17 in the tail of the carcass 11. An adjustable arm 18 is provided for limiting the extent of penetration into the carcass 11 of the blades 16. Both the cutter 14 and the arm 18 are supported from a pivotal member 19. The cutter 14 rides on a shaft 20 mounted on member 19, which is supported therefrom by members 22 and 23, respectively. The arm 18 is supported on member 19 by another support member 24. The arm 18 is provided with a slot 25 such that by adjusting the bolt 26 the arm 18 may be adjusted to and from the carcass 11. The pivotal member 19 is pivotally supported on a shaft 30 by brackets 31. A counterweight is provided at 32 to position cutter 14 against the carcass 11. The shaft 30 is so extended as to drive the cutter 14 by a sprocket 35 mounted thereon which drives a chain 36 and which in turn drives a sprocket 37. The shaft 30 is itself driven by a motor shown at 39 which drives a sprocket 40 mounted on a shaft 41 which is in turn coupled to sprocket 42 mounted on the shaft 30 by a chain 43. The motor 39 is supported from the housing 10 by a pair of rods 45 which include springs 46 positioned thereabout for biasing a support 48 away from the housing 10. In this manner, the cutter 14 is pushed outwardly toward the carcass 11. An adjustable screw 50 is also provided which is supported in a member 51 coupled to the support 48. By adjustment of the screw 50 the angular position of the pivotal member 19 may be altered so as to move blades 16 up or down from the carcass 11. Additionally, the size of the carcass raises and lowers the cutter mechanism. With a larger carcass the cutter mechanism will move rearwardly.

As an additional feature of this invention, a second cutter 55 is provided which is supported from the pivotal member 19 by a member 56 and is driven by a motor 57 through a flexible shaft 58. As may be more particularly seen in FIG. 3, the cutter 55 comprises a plurality of blades 62–64. As shown, these blades are spaced apart and are preferably in a parallel plane with each other. The cutter is driven from the flexible shaft 58 through a bearing connector 65 and through a further flexible shaft 66, such that it may pivot slightly about the flexible shaft 66 to accommodate various-dimensioned poultry tail portions as shown at 68. The cutter 55 performs the function of slicing into the tail portion 68 below the oil gland 17 so that, as the cutter 14 gouges the oil gland from the carcass, the end of the oil gland will fall cleanly from the carcass and not have to be removed by a subsequent hand-slicing step. As may be clearly seen in FIG. 2, the cutter 55 acts on the poultry carcass prior to the action of cutter 14. In this manner the oil gland is more easily removed in a clean-cut manner. It is to be understood that the steps may be reversed if desired, but the action of the cutter 55 prior to the action of cutter 14 is preferred.

In order to hold the tail portion 68 against the cutter 55, there is provided a member 70 which supports a guidebar 71 and a pusher 72 which is resiliently biased against the tail portion 68. In this manner the tail portion 68 is forced against cutters 62–64. A plurality of blades is used to accommodate different sized poultry carcasses, i.e., a bird having a longer tail will be sliced by all three blades 62–64, whereas one with a shorter tail might be sliced only by blade 62.

Again referring more particularly to FIGS. 1 and 2, there is shown the conveying mechanism at 80 presenting the poultry carcass 11 to the cutters 55 and 14, respectively. The conveying mechanism 80 comprises a motor 81 supported by the housing 10 and having a gear train 82 for driving a shaft 83 and a sprocket 84. A chain 85 is mounted on sprocket 84 and rotates a sprocket 86 mounted on another shaft 87. The shaft 87 is supported from housing members clearly shown in FIG. 1.

Positioned on shaft 87 is an additional drive sprocket 88 for driving an endless chain or belt 89 about an idler sprocket 90 which is supported from the housing 10. Positioned about chain 89 is a plurality of guides 91. Each of these guides includes curvilinearly-shaped arms 92 and 93 pivotally supported at 94 and 95 by links 96 and 97 respectively, mounted on chain 89. The arms 92 and 93 are supported together at their other ends 98 about a member 99, such that they may rotate about member 99. It is to be understood that arms 92 and 93 could be unitary, in so long as they are capable of bending away from and toward each other.

Preferably positioned between links 96 and 97 of adjacent guides 91 is a spacer link 100 which prevents the carcass 11 from being squeezed between the links 96 and 97. The guides 91 will pick up the carcass as it is provided by the overhead conveyor 12 and present it to the cutters 55 and 14. The guides 91 will force the carcass against a guidebar 101. In this manner the carcass is guided through the oil gland removing aparatus. Guide rods 102 and 103 are also provided for guiding the legs 104 of the carcass 11 through the apparatus.

Referring now to FIG. 4, there is shown an additional embodiment of a conveyor system which may be used in FIGS. 1–3. In this embodiment there is shown a first conveyor system 110 of the type described with respect to FIGS. 1–3, and a second conveyor system 111 also of the type disclosed in FIGS. 1–3. By the use of the two conveyor systems operating in timed relationship to each other, the carcass 11 can be completely surrounded and forced toward cutters 55 and 14. The mechanism for driving conveyors 110 and 111 may be the same as disclosed in FIGS. 1–3 for the conveyor system shown therein or may comprise a cross chain arrangement 115 driven by a motor 116, as shown.

With reference to FIG. 5, there is shown an improved mechanism for pivotally supporting arms 92 and 93 of the guides 91. In this figure one arm of adjacent guides 91 is shown. An adjustable feature is provided to permit the arms 92 and 93 to move outwardly or inwardly, depending upon the size of the poultry carcass. The adjustable feature is provided by the use of a link 122 coupled to the chain 89, having pivotally mounted links 123 and 124 coupled thereto. Pivotally coupled to links 123 and 124 are additional links 125 and 126 which support arms 92 and 93. A coil spring mechanism is provided at 127 to restrain the movement of links 123 and 124. Thus, as a larger poultry carcass is forced between arms 92 and 93, the links 125 and 126 will move outwardly to permit the larger carcass to be supported.

In FIG. 6 there is also shown another embodiment for permitting the larger or smaller sized carcasses to be held within guides 91. In this figure the arms 92 and 93 are of a slightly different configuration than as appear in FIGS. 1–5. In this embodiment the chain 89 has mounted therefrom a plurality of links 135–139. The arms 92 and 93 are provided with slots 140 and 141. Within these slots are positioned pins 142 and 143 for supporting arms 92 and 93 on links 139 and 135, respectively. There is also provided a coil spring mechanism 145 mounted about a pin 146 positioned on link 137. The mechanism 145 engages pins 148 and 149 mounted on arms 92 and 93, respectively. In this manner the arms are tensed so as to prevent them from moving outwardly about pins 142 and 143, respectively, unless a larger dimensioned carcass is encountered.

It will thus be seen that the objects set forth above, among those made apparent from the preceding description, are efficiently attained and since certain changes may be made in the constructions set forth, such as indicated hereinbefore, it is intended that all matter contained in the foregoing description and shown in the accompanying drawings shall be interpreted as illustrative and not in a limiting sense.

What is claimed is:

1. A device for removing oil glands from poultry carcasses or the like, comprising in combination first cutter means for cutting the oil gland from the carcass and second cutter means for slicing into a portion of the carcass in proximity to the location of the oil gland to facilitate the removal of the oil gland.

2. A device according to claim 1, in which third means are provided for guiding a carcass into position to be acted upon by said first and second cutter means.

3. A device according to claim 2, in which the first cutter means is positioned with respect to the third means such that the first cutter means acts on the carcass after the operation of the second cutter means.

4. A device according to claim 1, in which there is provided means for resiliently biasing the tail portion of the carcass toward the second cutter means.

5. A device according to claim 1, in which the second cutter means includes a plurality of slicing blades spaced apart from each other and mounted in substantially parallel planes.

6. A device according to claim 1, in which the first and second cutter means are slidably supported for movement toward and from said carcass.

7. A device according to claim 2, in which means are provided for limiting the penetration of the cutters into said carcass.

8. A device according to claim 2, in which the third means comprises a first drive means having mounted thereon a plurality of curvilinear members, said members positioned to guide the carcass before the cutters.

9. A device according to claim 8, in which there is provided a guidebar positioned opposite the curvilinear members against which the carcass is forced by said curvilinear members.

10. A device according to claim 8, in which there is provided a second drive means having mounted thereon a second plurality of curvilinear members for cooperating with the first plurality of curvilinear members to position a carcass before the cutters.

11. A device according to claim 6, in which the first and second cutter means are pivotally supported for movement.

References Cited

UNITED STATES PATENTS 3,191,221   6/1965   Kesler et al. _____ 17—11
3,213,488   10/1965  Volpe _____ 17—11

LUCIE H. LAUDENSLAGER, *Primary Examiner.*

U.S. Cl. X.R.

17—45